United States Patent
Yokomakura et al.

(10) Patent No.: US 8,494,080 B2
(45) Date of Patent: Jul. 23, 2013

(54) RADIO COMMUNICATION SYSTEM, RECEPTION DEVICE, AND RECEPTION METHOD

(75) Inventors: Kazunari Yokomakura, Osaka (JP); Yasuhiro Hamaguchi, Osaka (JP); Hideo Namba, Osaka (JP); Shimpei To, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 335 days.

(21) Appl. No.: 12/809,528

(22) PCT Filed: Dec. 19, 2008

(86) PCT No.: PCT/JP2008/073188
§ 371 (c)(1),
(2), (4) Date: Jun. 18, 2010

(87) PCT Pub. No.: WO2009/081860
PCT Pub. Date: Jul. 2, 2009

(65) Prior Publication Data
US 2010/0266065 A1 Oct. 21, 2010

(30) Foreign Application Priority Data
Dec. 20, 2007 (JP) ................ P2007-329009

(51) Int. Cl.
*H04B 15/00* (2006.01)
(52) U.S. Cl.
USPC ........... 375/285; 375/260; 375/316; 370/252
(58) Field of Classification Search
USPC ............. 370/342, 441; 375/259, 285, 316, 375/341
See application file for complete search history.

(56) References Cited

U.S. PATENT DOCUMENTS

| | | | | |
|---|---|---|---|---|
| 8,149,969 | B2* | 4/2012 | Khan et al. | 375/347 |
| 2003/0012310 | A1* | 1/2003 | Nagayasu | 375/341 |
| 2004/0037262 | A1* | 2/2004 | Tanada | 370/342 |
| 2006/0008014 | A1 | 1/2006 | Tamaki et al. | |
| 2006/0203727 | A1 | 9/2006 | Aizawa et al. | |

(Continued)

FOREIGN PATENT DOCUMENTS

| | | |
|---|---|---|
| JP | 2003-69531 A | 3/2003 |
| JP | 2004-266353 A | 9/2004 |

(Continued)

OTHER PUBLICATIONS

Falconer et al., "Frequency Domain Equalization for Single-Carrier Broadband Wireless Systems", IEEE Communications Magazine, vol. 40, pp. 58-66, Apr. 2002.

*Primary Examiner* — Leon-Viet Nguyen
(74) *Attorney, Agent, or Firm* — Birch, Stewart, Kolash & Birch, LLP

(57) ABSTRACT

A reception device which receives a signal transmitted by a transmission device which changes at least one of a modulation scheme and a coding rate. The reception device includes an equalization unit which equalizes a received signal in frequency domain, a reliability calculation unit which calculates the reliability of a transmitted bit from the received signal after equalization, a mutual information amount calculation unit which calculates a mutual information amount based on the reliability of the transmitted bit calculated by the reliability calculation unit, and a notification signal generation unit which sets at least one of a modulation scheme and a coding rate based on the mutual information amount calculated by the mutual information amount calculation unit to generate a signal to be reported to the transmission device.

12 Claims, 5 Drawing Sheets

U.S. PATENT DOCUMENTS

| | | |
|---|---|---|
| 2008/0151989 A1 * | 6/2008 | Von Elbwart et al. ........ 375/239 |
| 2008/0259901 A1 | 10/2008 | Friedman et al. |
| 2010/0220708 A1 * | 9/2010 | Mantravadi et al. .......... 370/343 |

FOREIGN PATENT DOCUMENTS

| | | |
|---|---|---|
| JP | 2005-510904 A | 4/2005 |
| JP | 2006-25067 A | 1/2006 |
| JP | 2006-501695 A | 1/2006 |
| JP | 2006-332786 A | 12/2006 |
| JP | 2008-271512 A | 11/2008 |
| WO | WO 03/041330 A2 | 5/2003 |
| WO | WO 03/047198 A2 | 6/2003 |
| WO | WO 2007/029406 A | 3/2007 |

* cited by examiner

RADIO COMMUNICATION SYSTEM, RECEPTION DEVICE, AND RECEPTION METHOD

TECHNICAL FIELD

The present invention relates to a radio communication system, a reception device, and a reception method.

Priority is claimed on Japanese Patent Application No. 2007-329009, filed on Dec. 20, 2007, the contents of which are incorporated herein by reference.

BACKGROUND ART

In recent years, research on next-generation mobile communication systems has been actively conducted. In the research on such next-generation mobile communication systems, a cellular system which repeatedly uses one frequency has been proposed as a system for increasing the frequency use efficiency of the system. In this cellular system, each cell uses the same frequency band, thereby enabling each cell to use all bands allocated to the system.

As a communication scheme to be used by downlink, an OFDMA (Orthogonal Frequency Division Multiple Access) scheme is the most prominent candidate. The downlink refers to communication from a base station device to a mobile station. The OFDMA scheme is a system which performs communication by flexibly allocating radio resources to a plurality of mobile terminal devices using an OFDM signal to be communicated with a different modulation scheme for information data in response to a reception situation. Modulation schemes are 64QAM (64-ary Quadrature Amplitude Modulation), BPSK (Binary Phase Shift Keying), and the like. The radio resources are constituted by a time axis and a frequency axis.

In general, even when frequency selectivity fading occurs in the entire transmission band for an OFDM signal, a delay wave of a propagation channel may be treated as flat fading in view of a sub-carrier unit. This is because each sub-carrier is a narrow band.

Since control may be independently performed in the sub-carrier unit, inter-code interference caused by the delay wave does not exist and equalization is not necessary. Thus, the mobile station may detect a received signal of each sub-carrier in a reception situation as it is. Accordingly, the mobile station may appropriately control the quality of transmission when an adaptive modulation scheme is used to allocate an appropriate modulation scheme in response to the reception situation.

In this case, a PAPR (Peak to Average Power Ratio) may be greatly raised to use an OFDM signal. The occurrence of high peak power is not a large problem in downlink communication which has a relative margin for amplifying transmission power. However, the occurrence of high peak power is a fatal problem in uplink for which no margin exists for amplifying transmission power. The uplink refers to communication from the mobile station to the base station device.

Thus, in the uplink, it is desirable to use a communication scheme based on a single carrier scheme having a low PAPR.

However, when the communication scheme based on the single carrier scheme is used, a sub-carrier may not be independently processed as in the OFDM scheme. Thus, since inter-code interference caused by a delay wave may not be suppressed, an adaptive equalization technique is necessary to suppress inter-code interference of a reception signal.

As an adaptive equalization technique, there has been proposed a frequency domain equalization technique (FDE: Frequency Domain Equalization) in which equalization is possible by one product operation in frequency domain by adding a CP (Cyclic Prefix) for the purpose of maintaining periodicity for a time signal into which a plurality of transmission signals has been blocked even under a multipath fading environment and removing the CP by a reception side (Non-Patent Document 1). Since an FFT unit becomes a block, the blocked transmission signals are referred to as an FFT block.

In the frequency domain equalization technique (FDE), a type of ZF (Zero Forcing) is known which restores a signal component by multiplying an inverse characteristic of a frequency response of a propagation channel based on the fact that the convolution of an impulse response on the time axis is a multiplication of the frequency domain. However, since thermal noise is reliably added to a received signal inside the mobile station when the equalization is performed by a reception side, the inverse characteristic of the propagation channel is multiplied even in the terms of noise when the inverse characteristic of the propagation channel is multiplied. As a result, there is a problem in that a transmission characteristic thereof is worse than an actual transmission characteristic since the noise is colored and emphasized.

For the purpose of suppressing noise emphasis, MMSE-FDE based on the MMSE (Minimum Mean Square Error) criterion has been proposed to minimize the square of an error between a signal after equalization and a transmission signal. A tap matrix of MMSE-FDE is expressed by Equation (1).

$$W^H = (\Xi\Xi^H + \sigma^2 I)^{-1}\Xi \quad (1)$$

In Equation (1), W is a tap matrix expressed by a complex square matrix of an FFT block size using a tap coefficient as an element. $\Xi$ is a complex diagonal matrix in which a frequency response of a propagation channel is arranged in a diagonal component. I is a unit matrix in which only the diagonal matrix is 1 and the remaining elements are 0. $\sigma^2$ is a real number indicating a variance of thermal noise. In general, the tap matrix is expressed by the following equation when a $k^{th}$ transmitted signal within the FFT block is estimated by equalization.

$$s_{est}(k) = F^H w^H(k) R$$

In this regard, F is a K×K complex square matrix to apply a DFT process. K is a block size of the FFT block. w(k) is a K×1 complex column vector for detecting the $k^{th}$ transmitted signal within the FFT block. R denotes a K×1 complex received signal vector of a frequency axis.

The tap matrix of Equation (1) is extended to simultaneously detect all symbols within the block and is extended as in the following equation.

$$W = [w(1) w(2) \ldots w(K)]$$

On the other hand, adaptive modulation and coding schemes are attracting attention as a technique of improving the efficiency of transmission. The adaptive modulation and coding schemes are a technique of selecting a modulation scheme which maximizes a transmission rate in a state in which the required quality is satisfied or selecting a coding rate in communication channel coding so as to maintain the equality of transmission for a temporal change of characteristics of a propagation channel.

In general, the adaptive modulation and coding schemes measure the quality of reception including a distortion of the propagation channel for each transmission opportunity based on error-rate characteristics measured under an AWGN (Additive White Gaussian Noise) environment without a distortion by the propagation channel. A modulation scheme or coding rate capable of accomplishing a maximum transmission rate while satisfying the required quality is determined.

For example, as combinations of available modulation schemes and coding rates, received SNRs necessary at a bit error rate $10^{-5}$ in BPSK of a coding rate ½, BPSK of a coding rate ⅔, QPSK of a coding rate ½, QPSK of a coding rate ¾, and QPSK of a coding rate ⅚ under an AWGN environment are set to 1 dB, 2 dB, 3 dB, 6 dB, and 8 dB, respectively. It is assumed that a received SNR measured in a certain transmission opportunity is 7.5 dB. In this case, the selected modulation scheme and coding rate satisfy the required quality at 7.5 dB or less, and QPSK of a coding rate ¾ in which a highest transmission rate may be achieved is set as the modulation scheme and the coding rate.

Here, in the case where the adaptive modulation and coding schemes are adopted in a single carrier scheme even though an equalization scheme called MMSE-FDE is used, a modulation scheme is generally adopted based on an SNR (Signal to Noise power Ratio) before equalization.

Non-Patent Document 1: D. Falconer, S. L. Ariyavisitakul, A. Benyamin-Seeyar, and B. Eidson, "Frequency Domain Equalization for Single-Carrier Broadband Wireless Systems," IEEE Communications Magazine, vol. 40, pp. 58 to 66, April 2002.

DISCLOSURE OF INVENTION

Problem to be Solved by the Invention

However, in terms of the tap matrix of Equation (1), the tap coefficient in a $k^{th}$ discrete frequency is given as in Equation (2), and the magnitude of a tap at each frequency is set in response to the quality of reception of each frequency.

$$w^*(k) = \frac{\Xi(k)}{\Xi(k)\Xi^*(k) + \sigma^2} \quad (2)$$

In Equation (2), w(k) is a tap coefficient multiplied by the $k^{th}$ discrete frequency within the block. $\Xi(k)$ is a complex gain of the propagation channel in the $k^{th}$ discrete frequency. $\sigma^2$ denotes a variance of noise observed.

This means that an MMSE type FDE does not multiply an inverse characteristic of the propagation channel and a correction term corresponding to the quality of reception is set as $\sigma^2$ so that the balance of the effect of inter-code interference and noise emphasis becomes optimal from the purpose of suppressing the noise emphasis which is problematic by multiplying the inverse characteristic.

Also, this means that not only a change in the frequency axis of the tap coefficient caused by a delay variance of the propagation channel becomes severe even though the average received SNR is identical because of dependence upon a propagation channel characteristic and a noise variance, but also the effect of inter-code interference or noise emphasis which is not cut off is different.

This means that an inter-code interference quantity or a noise emphasis quantity incapable of being removed is different in the case where the delay variance of the propagation channel is different even though the average received SNR before equalization is identical.

Since the adaptive modulation and coding schemes were originally introduced for the purpose of maintaining the quality of reception, there is a problem in that the effect of inter-code interference or noise emphasis which is not cut off after equalization is excluded when setting is made in response to a received SNR before equalization, and an operation is not appropriately performed. For example, when a received SNR after equalization reaches an SNR effectively corresponding to 5 dB due to the effect of inter-code interference or noise emphasis, regardless of the fact that a received SNR measured before equalization is 6 dB, there is a problem in that the required quality is not satisfied in the case where the modulation scheme and the coding rate in which the required quality is set by 6 dB are adopted.

Since it is necessary to separately calculate an inter-code interference quantity by returning a propagation channel characteristic multiplied by a tap coefficient to a time domain so as to perform the adaptive modulation and coding schemes by the reception quality after equalization, there is a problem in that the calculation becomes complex. At this time, the received SNR of a $k^{th}$ signal within the block is expressed by Equation (3).

$$SNR = \frac{|h_{eq}(1)s(k)|^2}{\left|\sum_{l=2}^{K}\sum_{l'=1}^{K} h_{eq}(l)s(k-(l-1)-l') + n(k)\right|^2} \quad (3)$$

In Equation (3), K is the number of signals to be included within the block. $h_{eq}(l)$ is an $l^{th}$ propagation channel gain of an impulse response of an equivalent propagation channel by frequency-time converting the frequency response of the propagation channel multiplied by the tap coefficient by IFFT. s(k) is a $k^{th}$ time signal within the block. n(k) is a noise component obtained by converting noise of a frequency multiplied by a tap coefficient in the $k^{th}$ time signal within the block into a time signal by IFFT. Since not only IFFT is used to estimate $h_{eq}(l)$ or n(k), but it is also necessary to further use Equation (3) even though these are calculated, a large amount of calculation is necessary to calculate the received SNR.

The present invention has been made in view of the above-described circumstances, and an object of the invention is to provide a radio communication system, a reception device, and a reception method which are capable of improving an error rate or throughput when transmission and reception devices perform communication.

Means for Solving the Problem (1) The present invention has been made to solve the above-described problems. According to an aspect of the present invention, there is provided a radio communication system including: a transmission device which performs transmission by changing at least one of a modulation scheme and a coding rate based on information reported from a reception device; and a reception device which equalizes a distortion of a radio propagation channel by frequency domain equalization, wherein the reception device sets at least one of a modulation scheme and a coding rate based on the reliability of each transmitted bit.

(2) According to the aspect of the present invention, the reception device of the radio communication system may perform the frequency domain equalization based on minimum mean square error.

(3) According to the aspect of the present invention, the reception device of the radio communication system may calculate the reliability of each transmitted bit based on a mutual information amount calculated from a log likelihood ratio.

(4) According to the aspect of the present invention, the reception device of the radio communication system may calculate the reliability of each transmitted bit based on a mutual information amount calculated from a transmitted signal to which a known bit has been allocated.

(5) According to another aspect of the present invention, there is provided a reception device which receives a signal transmitted by a transmission device which changes at least one of a modulation scheme and a coding rate, the reception device including: an equalization unit which equalizes a received signal in frequency domain; a reliability calculation unit which calculates the reliability of a transmitted bit from the received signal after the equalization unit equalizes the received signal; a mutual information amount calculation unit which calculates a mutual information amount based on the reliability of the transmitted bit calculated by the reliability calculation unit; and a notification signal generation unit which sets at least one of a modulation scheme and a coding rate based on the mutual information amount calculated by the mutual information amount calculation unit to generate a signal to be reported to the transmission device.

In the present invention, it is possible to appropriately operate adaptive modulation and coding schemes and improve an error rate or throughput when the reception device and the transmission device perform communication by setting a modulation scheme in an adaptive modulation scheme in response to a reliability of a transmitted bit obtained after equalization, not before equalization.

(6) According to the other aspect of the present invention, the equalization unit of the reception device may equalize the received signal based on minimum mean square error.

(7) According to the other aspect of the present invention, the reliability calculation unit of the reception device may calculate a log likelihood ratio based on an equivalent amplitude gain or a variance of equivalent noise.

(8) According to the other aspect of the present invention, the mutual information amount calculation unit of the reception device may calculate the mutual information amount based on the log likelihood ratio calculated by the reliability calculation unit.

(9) According to a further aspect of the present invention, there is provided a reception device which receives a transmitted signal from a transmission device, the transmitted signal being multiplexed a pilot signal for propagation channel estimation and a transmission data signal, the transmission data signal being changed at least one of a modulation scheme and a coding rate in response to the quality of reception, the reception device including: an equalization unit which equalizes a received signal in frequency domain; a reliability calculation unit which calculates the reliability of a transmitted bit from the received signal after the equalization unit equalizes the received signal; a mutual information amount calculation unit which calculates a mutual information amount based on the reliability of the transmitted bit calculated by the reliability calculation unit; and a notification signal generation unit which sets at least one of a modulation scheme and a coding rate based on the mutual information amount to generate a signal to be reported to the transmission device.

(10) According to a still further aspect of the present invention, there is provided a reception method using a reception device which receives a signal transmitted by a transmission device which changes at least one of a modulation scheme and a coding rate, the reception method including: equalizing a received pilot signal in frequency domain; calculating a reliability of a transmitted bit from a received signal after equalization of the received pilot signal; calculating a mutual information amount based on the reliability of the transmitted bit obtained by the reliability calculation; and setting at least one of a modulation scheme and a coding rate based on the mutual information amount to generate a signal to be reported to the transmission device.

(11) According to a still further aspect of the present invention, there is provided a reception method using a reception device which receives a transmitted signal from a transmission device, the transmitted signal being multiplexed a pilot signal for propagation channel estimation and a transmission data signal, the transmission data signal being changed at least one of a modulation scheme and a coding rate in response to the quality of reception, the reception method including: equalizing a received signal in frequency domain; calculating a reliability of a transmitted bit from a received signal after equalization of the received pilot signal; calculating a mutual information amount based on the reliability of the transmitted bit calculated by the reliability calculation; and setting at least one of a modulation scheme and a coding rate based on the mutual information amount to generate a signal to be reported to the transmission device.

Effect of the Invention

According to the radio communication system, the reception device, and the reception method of the present invention, it is possible to improve an error rate or throughput when transmission and reception devices perform communication.

REFERENCE SYMBOLS

1: ENCODING UNIT
2: DETECTION UNIT
3: CODING RATE CONTROL UNIT
4: PUNCTURING UNIT
5: MODULATION SCHEME CONTROL UNIT
6: MODULATION UNIT
7: PILOT GENERATION UNIT
8: PILOT MULTIPLEXING UNIT
9: CP ADDITION UNIT
10: RADIO UNIT
11: TRANSMISSION ANTENNA
12: RECEPTION ANTENNA
13: RADIO UNIT
14: CP REMOVAL UNIT
15: PILOT SEPARATION UNIT

16: PROPAGATION CHANNEL CHARACTERISTIC ESTIMATION UNIT
17: VARIANCE ESTIMATION UNIT
18: FFT UNIT
19: EQUALIZATION UNIT
20: IFFT UNIT
21: DEMODULATION UNIT
22: DECODING UNIT
23: MODULATION/CODING RATE INFORMATION GENERATION UNIT
100a: TRANSMISSION DEVICE
101: MUTUAL INFORMATION AMOUNT CALCULATION UNIT
102: MODULATION/CODING RATE DETERMINATION UNIT
103: MODULATION/CODING RATE INFORMATION MAPPING UNIT
200a, 200c: RECEPTION DEVICE

BEST MODE FOR CARRYING OUT THE INVENTION

Hereinafter, embodiments of the present invention will be described with reference to the drawings.

In the following embodiments, the case where a single carrier transmission scheme is used and MMSE criterion type FDE is used as a reception equalization scheme will be described. In a scheme capable of using MMSE criterion type frequency domain equalization, a scheme of frequency-converting an original time waveform, allocating it to an arbitrary frequency, and regenerating a time waveform from a frequency signal after allocation such as a DFT-S-OFDM (Discrete Fourier Transform Spread OFDM) scheme or an SC-ASA (Single Carrier with Adaptive Spectrum Allocation) may be used. A scheme in which a time signal is spread into a plurality of frequency signals such as MC-CDM (Multi-Carrier Code Division Multiplexing) may be used.

First Embodiment

Figure 1:
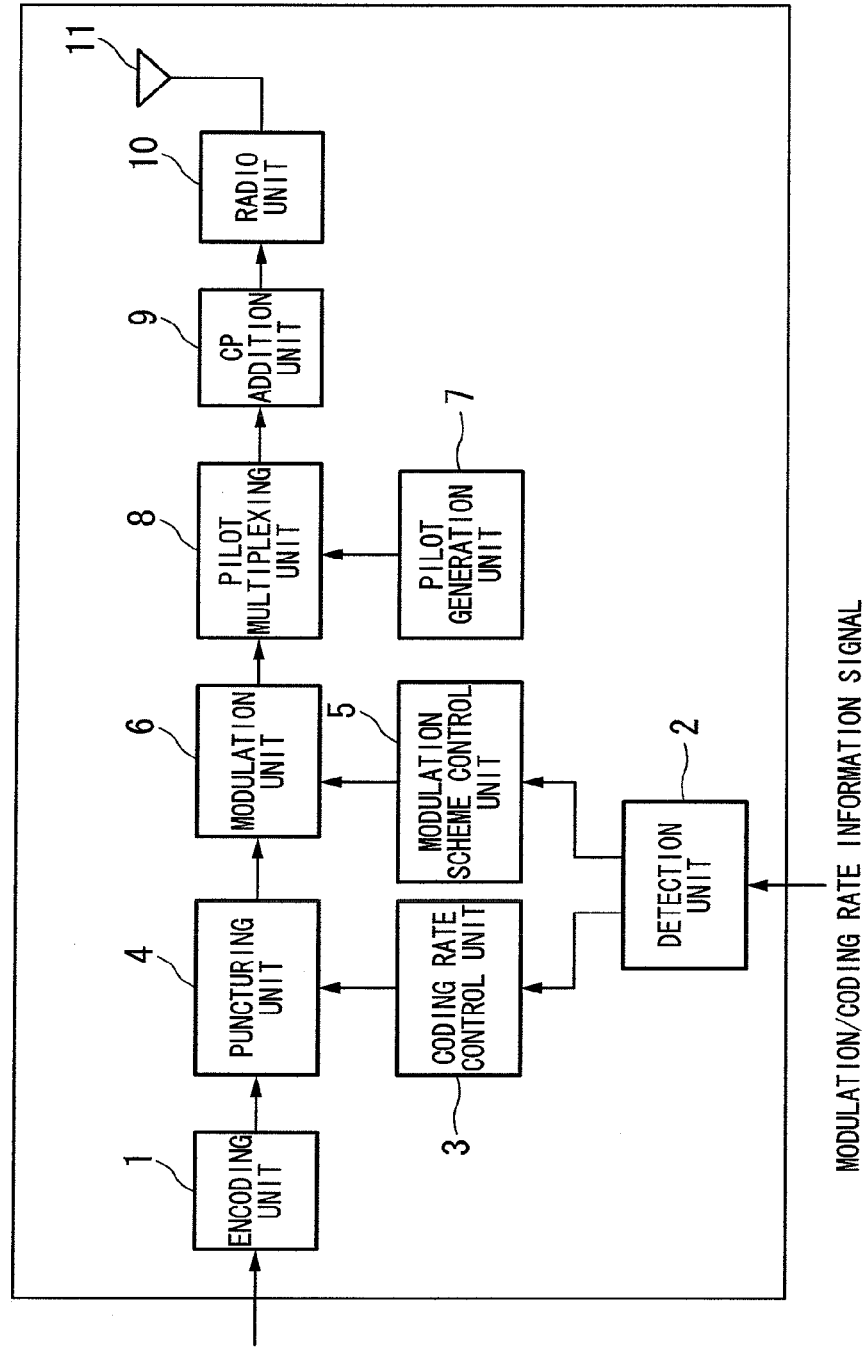
FIG. 1 is a schematic block diagram showing the configuration of a transmission device 100a according to a first embodiment of the present invention.

FIG. 1 is a schematic block diagram showing the configuration of a transmission device 100a according to a first embodiment of the present invention. A mobile station device includes a transmission device and a reception device for communicating with a base station device. The transmission device provided in the mobile station device corresponds to the transmission device 100a of FIG. 1. The transmission device 100a of FIG. 1 is applicable to other equipment.

The transmission device 100a has an encoding unit 1, a detection unit 2, a coding rate control unit 3, a puncturing unit 4, a modulation scheme control unit 5, a modulation unit 6, a pilot generation unit 7, a pilot multiplexing unit 8, a CP addition unit 9, a radio unit 10, and a transmission antenna 11.

A transmission bit is error-correction-coded by the encoding unit 1, and is input to the puncturing unit 4. On the other hand, a coding rate and a modulation scheme are detected by the detection unit 2 from modulation/coding rate information (MCS: Modulation and Coding Schemes) reported from the reception device. The coding rate information detected by the detection unit 2 is input to the coding rate control unit 3. The modulation scheme information detected by the detection unit 2 is input to the modulation scheme control unit 5.

The puncturing unit 4 executes a puncturing process for code bits input from the encoding unit 1. The puncturing process is a process of puncturing code bits so that a set coding rate is provided.

At this time, the coding rate control unit 3 controls the code bits to be punctured in response to a puncturing pattern from the set coding rate information. The puncturing pattern is a pattern prepared to puncture bits. Thereby, the puncturing unit 4 generates code bits of an appropriate coding rate.

Next, the code bits obtained by the puncturing are input to the modulation unit 6, and are modulated in a set modulation scheme. At this time, the modulation scheme control unit 5 controls the set modulation scheme to be provided.

At this time, simultaneously, the pilot generation unit 7 generates a pilot signal for estimating a frequency response of a propagation channel, and the pilot multiplexing unit 8 multiplexes the pilot signal with a modulated signal obtained by the modulation unit 6. A cyclic prefix (CP) is added to a multiplexed transmission signal by the CP addition unit 9. The transmission signal is up-converted into a radio frequency band by the radio unit 10 and is transmitted from the transmission antenna 11 to the reception device.

Figure 2:
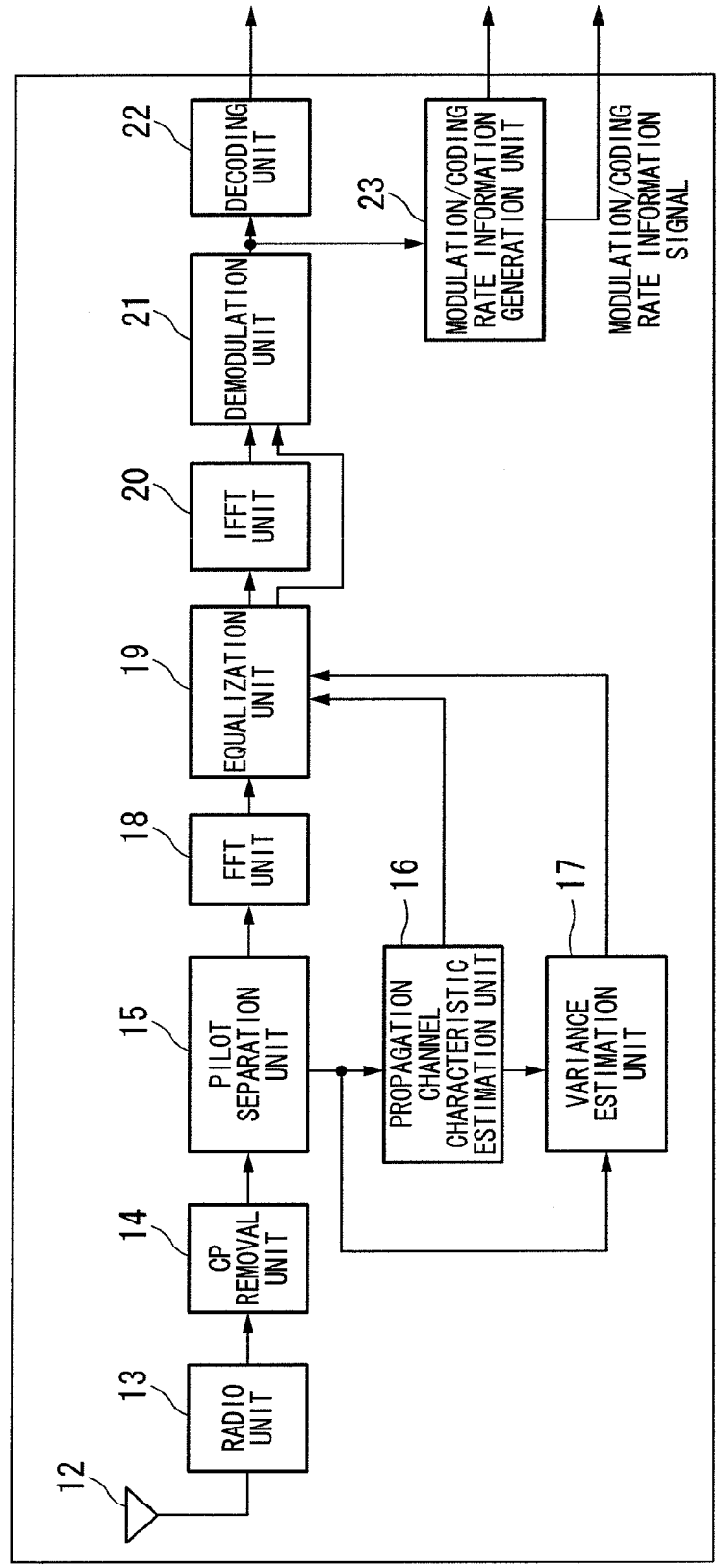
FIG. 2 is a schematic block diagram showing the configuration of a reception device 200a according to the first embodiment of the present invention.

FIG. 2 is a schematic block diagram showing the configuration of a reception device 200a according to the first embodiment of the present invention. A base station device has a transmission device and a reception device for communicating with the mobile station device. The reception device provided in the base station device corresponds to the reception device 200a of FIG. 2. The reception device 200a of FIG. 2 is applicable to other equipment. The reception device 200a has a reception antenna 12, a radio unit 13, a CP removal unit 14, a pilot separation unit 15, a propagation channel characteristic estimation unit 16, a variance estimation unit 17, an FFT unit 18, an equalization unit 19, an IFFT unit 20, a demodulation unit 21 (also referred to as a reliability calculation unit), a decoding unit 22, and a modulation/coding rate information generation unit 23.

A received signal is received by the reception antenna 12 and then is down-converted from the radio frequency into a baseband signal by the radio unit 13. A cyclic prefix (CP) is removed by the CP removal unit 14 from the obtained received signal. A received pilot signal and a received modulated signal are separated by the pilot separation unit 15. A frequency characteristic of a propagation channel and a variance of noise of each frequency are estimated by the propagation channel characteristic estimation unit 16 and the variance estimation unit 17. For use in equalization, the separated received pilot signal is input to the equalization unit 19.

Here, the variance estimation unit 17 estimates a variance of the received pilot signal from the propagation channel characteristic estimated by the propagation channel characteristic estimation unit 16 and the received signal. At this time, the variance $\sigma^2$ is defined by calculating a mean square value and is estimated as in the following Equation (4).

$$\sigma^2 = \frac{1}{K}\sum_{k=1}^{K}|y(k) - \Xi(k)c(k)|^2 \qquad (4)$$

In Equation (4), K is the number of signals within a block. $y(k)$ is a complex received pilot signal of a $k^{th}$ frequency. $\Xi(k)$ is a complex gain of the propagation channel in the $k^{th}$ frequency estimated by the propagation channel characteristic estimation unit 16. $c(k)$ is a transmitted pilot signal of the $k^{th}$ frequency known at the transmission and reception sides.

In Equation (4), the received pilot signal which is not affected by noise is generated by $\Xi(k)c(k)$. An error obtained by subtracting $\Xi(k)c(k)$ from the received pilot signal $y(k)$ corresponds to noise. A variance of noise is calculated by averaging power of the received pilot signal in the frequency direction and calculating a mean square value.

On the other hand, the received signal from which the pilot signal has been separated is converted into a frequency signal by the FFT unit 18. Based on the frequency characteristic of the propagation channel, the equalization unit 19 equalizes the received signal in the frequency domain. The equalization unit 19 outputs an equivalent amplitude gain calculated from a tap coefficient.

At this time, the distortion and noise of the transmitted signal to which the equalization process has been applied are considered, and the tap matrix by Equation (5) is calculated using the frequency characteristic of the propagation channel estimated by the propagation channel characteristic estimation unit 16 and the variance value calculated by the variance estimation unit 17.

$$W^H = \Xi^H(\Xi\Xi^H + \sigma^2 I)^{-1} \quad (5)$$

In Equation (5), $\Xi$ is a propagation channel matrix in which a frequency response of a propagation channel is arranged in a diagonal component. $\sigma^2$ is a real number indicating a variance of noise before equalization. I is a unit matrix in which only diagonal components are 1 and non-diagonal components are 0. $x^H$ is an adjoint matrix (Hermitian transpose matrix) of a matrix x. The received signal is equalized by multiplying the received signal by the tap matrix obtained by Equation (5), and the equalized received signal is input to the IFFT unit 20. Also, the equalization unit 19 calculates an equivalent amplitude gain using the tap matrix. The equivalent amplitude gain is calculated by Equation (6).

$$\mu_z = \frac{1}{K}\sum_{k=1}^{K} w^*(k)\Xi(k) \quad (6)$$

In Equation (6), $\mu_z$ is an equivalent amplitude gain. $w^*(k)$ is a complex conjugate of the tap coefficient of the $k^{th}$ frequency. $\Xi(k)$ denotes a complex gain of the propagation channel of the $k^{th}$ frequency. A variance of equivalent noise is expressed by Equation (7) using the equivalent amplitude gain $\mu_z$ obtained by Equation (6).

$$\sigma_z^2 = \mu_z(1-\mu_z) \quad (7)$$

The IFFT unit 20 converts the equalized received signal into a time domain signal and the time domain signal is input to the demodulation unit 21. The demodulation unit 21 calculates a log likelihood ratio (LLR) indicating a reliability of a transmitted code bit using the equivalent amplitude gain output from the equalization unit 19 and the received signal of the time domain after equalization output from the IFFT unit 20. Assuming that the obtained log likelihood ratio (LLR) follows a Gaussian distribution, the definition of the log likelihood ratio (LLR) is expressed by Equation (8).

$$l = \ln\left[\frac{p(a=1|l)}{p(a=0|l)}\right] = \frac{1}{\sigma_z^2}[-|l-\mu_z|^2 + |l+\mu_z|^2] \quad (8)$$

In Equation (8), ln [x] is an operator for calculating the natural logarithm of x. a is a transmitted bit. l is a log likelihood ratio (LLR).

In BPSK, bit information of 1 bit exists only for a real part. In QPSK, 1-bit information exists for a real part and 1-bit information exists for an imaginary part. In consideration thereof, when an MMSE criterion type of time domain equalization is performed, the demodulation unit 21 respectively calculates log likelihood ratios (LLRs) for BPSK and QPSK by Equations (9) and (10).

$$\lambda(k) = \frac{4\text{Re}[z(k)]}{1-\mu_z}(BPSK) \quad (9)$$

$$\lambda(2k) = \frac{4\text{Re}[z(k)]}{\sqrt{2}(1-\mu_z)}(QPSK \text{ bit \#1}) \quad (10)$$

$$\lambda(2k+1) = \frac{4\text{Im}[z(k)]}{\sqrt{2}(1-\mu_z)}(QPSK \text{ bit \#2})$$

In Equations (9) and (10), $\lambda(k)$ is a log likelihood ratio (LLR) of a $k^{th}$ transmitted bit. $z(k)$ is a received signal after equalization in a $k^{th}$ time index. $\mu_z$ is an equivalent amplitude gain. Re[x] is a real part of a complex number x. Im[x] is an imaginary part of the complex number x.

In a log likelihood ratio (LLR) index, a time index and a bit index match and use the same index since 1-bit information is modulated into one BPSK signal in the case of BPSK. Since 2-bit information is modulated into one QPSK signal in the case of QPSK, bit indices in the first bit and the second bit become 2 k and 2 k+1, respectively.

As described above, the log likelihood ratio (LLR) calculated by the demodulation unit 21 is input to the modulation/coding rate information generation unit 23 simultaneously when the decoding unit 22 performs an error correction process. The modulation/coding rate information generation unit 23 sets a modulation scheme and a coding rate in the next transmission priority using a mutual information amount calculated based on the log likelihood ratio (LLR), and feeds back modulation/coding rate information to the transmission device (FIG. 1).

In this embodiment, the case where an MMSE criterion type of FDE having the best reception characteristics has been described, but an equivalent amplitude gain and a variance of equivalent noise may be calculated using a zero forcing (ZF) type, equal gain combining (EGC), maximum ratio combining (MRC), or the like, and the log likelihood ratio (LLR) may be calculated by Equation (8) using values thereof.

As described above, in this embodiment, a modulation scheme and a coding rate in the adaptive modulation and coding schemes are set in response to the reliability of each code bit obtained by the demodulation unit 20. Thereby, it is possible to set a modulation scheme or a coding rate in the next transmission opportunity in consideration of the effect of inter-code interference or noise emphasis incapable of being removed by an equalization process by the equalization unit 19. Consequently, it is possible to appropriately control adaptive modulation and coding.

Second Embodiment

Next, the second embodiment of the present invention will be described. Since the configurations of a transmission device and a reception device are the same as those of the transmission device 100a (FIG. 1) and the reception device 200a (FIG. 2), description thereof is omitted.

Figure 3:
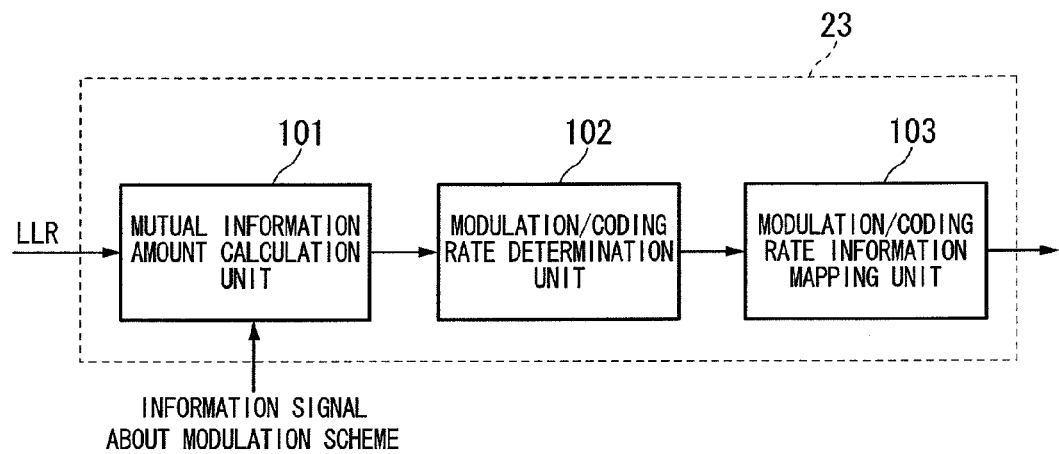
FIG. 3 is a schematic block diagram showing the configuration of a modulation/coding rate information generation unit 23 of the reception device according to a second embodiment of the present invention.

FIG. 3 is a schematic block diagram showing the configuration of the modulation/coding rate information generation unit 23 of the reception device according to the second embodiment of the present invention. The modulation/coding rate information generation unit 23 includes a mutual information amount calculation unit 101, a modulation/coding rate determination unit 102 (also referred to as a notification signal generation unit), and a modulation/coding rate information mapping unit 103.

The mutual information amount calculation unit 101 calculates a mutual information amount about a transmitted bit based on a log likelihood ratio (LLR) input from the demodulation unit 21 (FIG. 2) to the modulation/coding rate information generation unit 23.

The mutual information amount is a numerical value produced from the viewpoint of an information theory, which indicates how much information the reception device has obtained regarding a transmission signal X in the case where a received signal Y has been obtained by the reception device when the transmission device has transmitted the transmission signal X.

In this embodiment, the mutual information amount calculation unit 101 calculates the mutual information amount regarding the transmission signal X based on the log likelihood ratio (LLR) without producing the mutual information amount from the received signal Y.

The mutual information amount at the time of obtaining the log likelihood ratio (LLR) is calculated by the following Equation (11) under an assumption that the mutual information amount is based on an ergodic property that a time average and an ensemble average are identical and a consistency condition that occurrence probabilities of 0 and 1 are identical and a distribution follows an identical and symmetric Gaussian distribution.

$$I_x = 1 - \frac{2}{K_B}\sum_{k=1}^{K_B}\frac{\log_2(1+\exp(l_k))}{1+\exp(l_k)} \quad (11)$$

In Equation (11), $I_x$ is a mutual information amount expressed by a real number of 0 to 1. $K_B$ is a bit length. $l_k$ is a log likelihood ratio (LLR) of a $k^{th}$ bit. The mutual information amount is changed based on the modulation scheme by Equations (9) and (10). Consequently, a value of the mutual information amount for each modulation scheme is calculated in advance to set the modulation scheme.

For example, when a modulation scheme of a current transmission opportunity is BPSK, a mutual information amount obtained by Equation (11) is that of BPSK. From here, a mutual information amount in the case of QPSK is calculated by multiplying a log likelihood ratio (LLR) in BPSK by $1/\sqrt{2}$ from Equations (9) and (10). Consequently, assuming that transmission by QPSK has been performed from BPS K, the conversion into a mutual information amount may be performed by Equation (12).

$$I_x = 1 - \frac{2}{K_B}\sum_{k=1}^{K_B}\frac{\log_2\left(1+\exp(l_k/\sqrt{2})\right)}{1+\exp(l_k/\sqrt{2})} \quad (12)$$

Equation (12) calculates a mutual information amount to be obtained in the case of using QPSK in the same environment from a log likelihood ratio (LLR) obtained when transmission has been performed by BPSK. The conversion from QPSK into BPSK may be calculated by multiplying the log likelihood ratio (LLR) by $\sqrt{2}$.

The calculation of a log likelihood ratio (LLR) of 16QAM or 64QAM may be derived as in Equations (9) and (10). Even though multilevel modulation has been used, mutual information amounts may be converted into each other as long as a relationship of log likelihood ratios (LLRs) to be output is uniquely determined and a log likelihood ratio (LLR) of one modulation scheme is known.

Mutual information amounts of all selectable modulation schemes obtained as described above are input to the modulation/coding rate determination unit 102 and a combination of a modulation scheme and a coding rate is determined.

Figure 4:
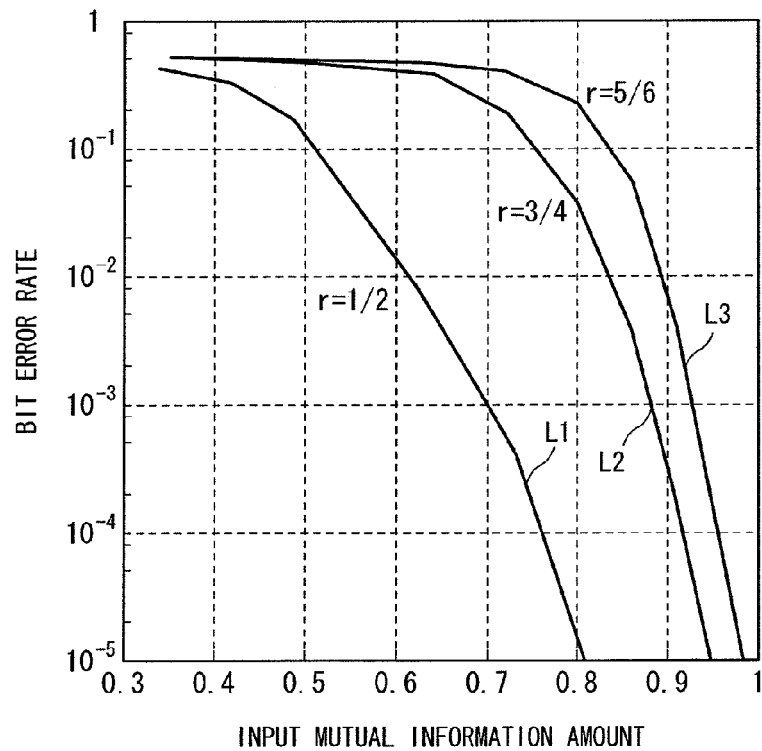
FIG. 4 is a graph showing characteristics of a bit error rate to an input mutual information amount at each coding rate according to the second embodiment of the present invention.

FIG. 4 is an example of a graph showing characteristics of a bit error rate to an input mutual information amount at each coding rate according to the second embodiment of the present invention. In FIG. 4, the horizontal axis represents an input mutual information amount obtained by Equation (11) or (12), and the vertical axis represents a bit error rate. Also, r denotes a coding rate. Three curves L1, L2, and L3 respectively represent the cases of coding rates r of ½, ¾, and ⅚. As the coding rate r is increased as shown in FIG. 4, the transmission rate is increased, but the accuracy of error correction is degraded. The higher the coding rate, the larger the mutual information amount necessary to achieve the same bit error rate. Here, a combination of a modulation scheme and a coding rate is determined using FIG. 4.

For example, the case where combinations of selectable modulation schemes are BPSK of a coding rate ½, BPSK of a coding rate ¾, QPSK of a coding rate ½, QPSK of a coding rate ¾, and QPSK of a coding rate ⅚ will be described. The case where a mutual information amount obtained by BPSK is 0.95, a mutual information amount by QPSK is 0.8, and the required quality is $10^{-5}$ will be described. Combinations which satisfy the required quality are the BPSK of the coding rate ½, the BPSK of the coding rate ¾, and the QPSK of the coding rate ½ from FIG. 4. In this case, the modulation/coding rate determination unit 102 selects a modulation scheme in which a multilevel number is smallest at the lowest coding rate. That is, the modulation/coding rate determination unit 102 selects the QPSK of the coding rate ½.

As described above, the modulation/coding rate information mapping unit 103 modulates the modulation scheme and the coding rate determined by the modulation/coding rate determination unit 102 into a given signal format predetermined by the transmission and reception sides, and feeds back the modulation scheme and the coding rate to the transmission device (FIG. 1).

As described above, a mutual information amount is calculated and used to select adaptive modulation and coding schemes, thereby recognizing the quality of reception in consideration of the effect of inter-code interference or noise emphasis incapable of being removed by frequency domain equalization and appropriately performing adaptive control.

Third Embodiment

Next, the third embodiment of the present invention will be described. Since the configuration of a transmission device of this embodiment is the same as that of the transmission device 100*a* (FIG. 1) of the first embodiment, description thereof is omitted.

Figure 5:
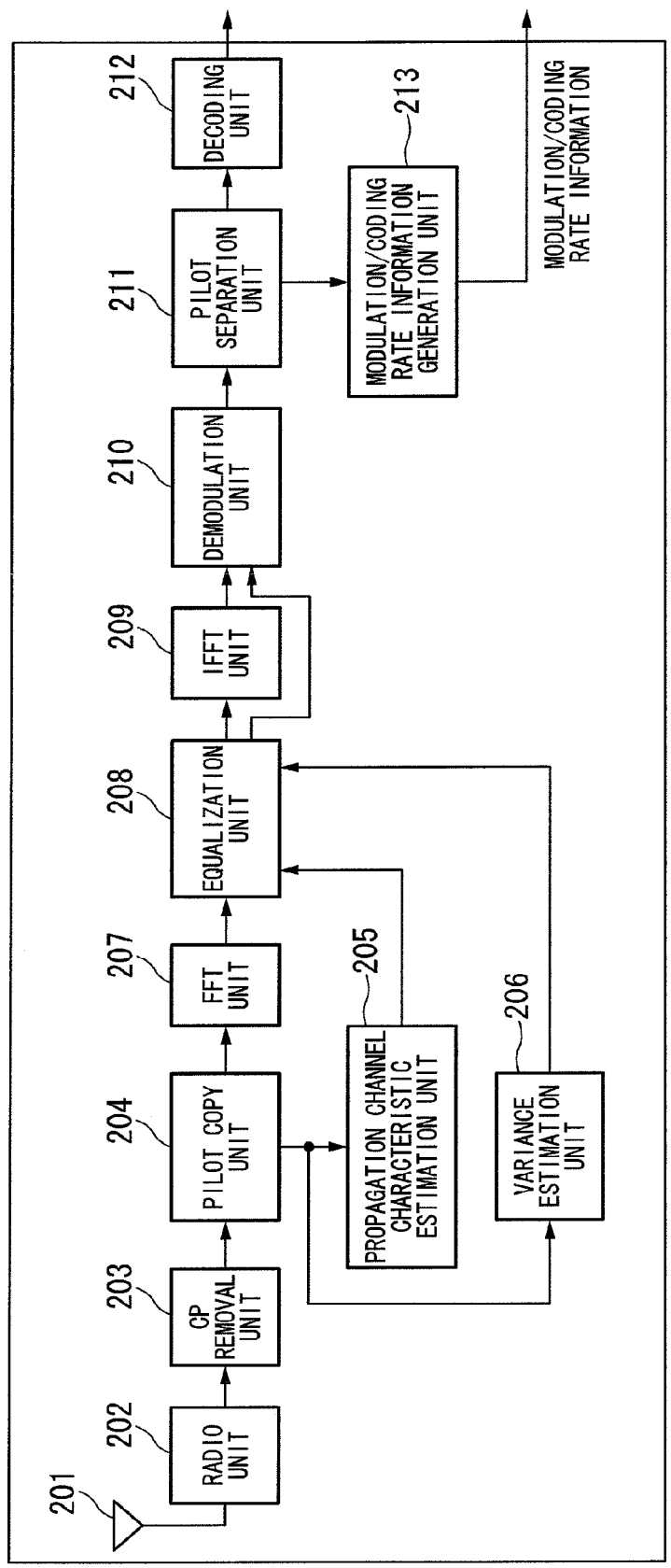
FIG. 5 is a schematic block diagram showing the configuration of a reception device 200c according to a third embodiment of the present invention.

FIG. 5 is a schematic block diagram showing the configuration of the reception device 200*c* according to the third embodiment of the present invention. The reception device 200*c* calculates a mutual information amount using a known sequence such as a pilot signal as a training sequence.

The reception device 200*c* includes a reception antenna 201, a radio unit 202, a CP removal unit 203, a pilot copy unit 204, a propagation channel characteristic estimation unit 205, a variance estimation unit 206, an FFT unit 207, an equalization unit 208, an IFFT unit 209, a demodulation unit 210, a pilot separation unit 211, a decoding unit 212, a modulation/coding rate information generation unit 213.

Since the reception antenna 201, the radio unit 202, the CP removal unit 203, the propagation channel characteristic estimation unit 205, the variance estimation unit 206, the FFT unit 207, the equalization unit 208, the IFFT unit 209, the demodulation unit 210, the decoding unit 212, and the modulation/coding rate information generation unit 213 of the reception device 200c respectively execute the same process as the reception antenna 12, the radio unit 13, the CP removal unit 14, the propagation channel characteristic estimation unit 16, the variance estimation unit 17, the FFT unit 18, the equalization unit 19, the IFFT unit 20, the demodulation unit 21, the decoding unit 22, and the modulation/coding rate information generation unit 23 of the reception device 200a (FIG. 2) of the first embodiment, description thereof is omitted.

The difference from the reception device 200a of the first embodiment is that a pilot signal is copied and also equalized to perform propagation channel estimation and variance estimation without separating the pilot signal after removing the cyclic prefix (CP). The pilot signal separation by the pilot separation unit 211 is performed after the demodulation unit 210 so as to calculate a reception situation after equalization.

In this embodiment, a known signal is used as a pilot signal in a process in the equalization unit 208. Consequently, a given bit sequence predetermined by the transmission and reception sides is modulated by a given modulation scheme, and is transmitted from the transmission device to the reception device. The reception device side recognizes how much information has been decreased by a propagation channel, noise, and equalization using the known bit sequence modulated.

Fourth Embodiment

Next, the fourth embodiment of the present invention will be described. Since the configurations of a transmission device and a reception device are the same as those of the transmission device and the reception device of the second embodiment, description thereof is omitted.

Figure 6:
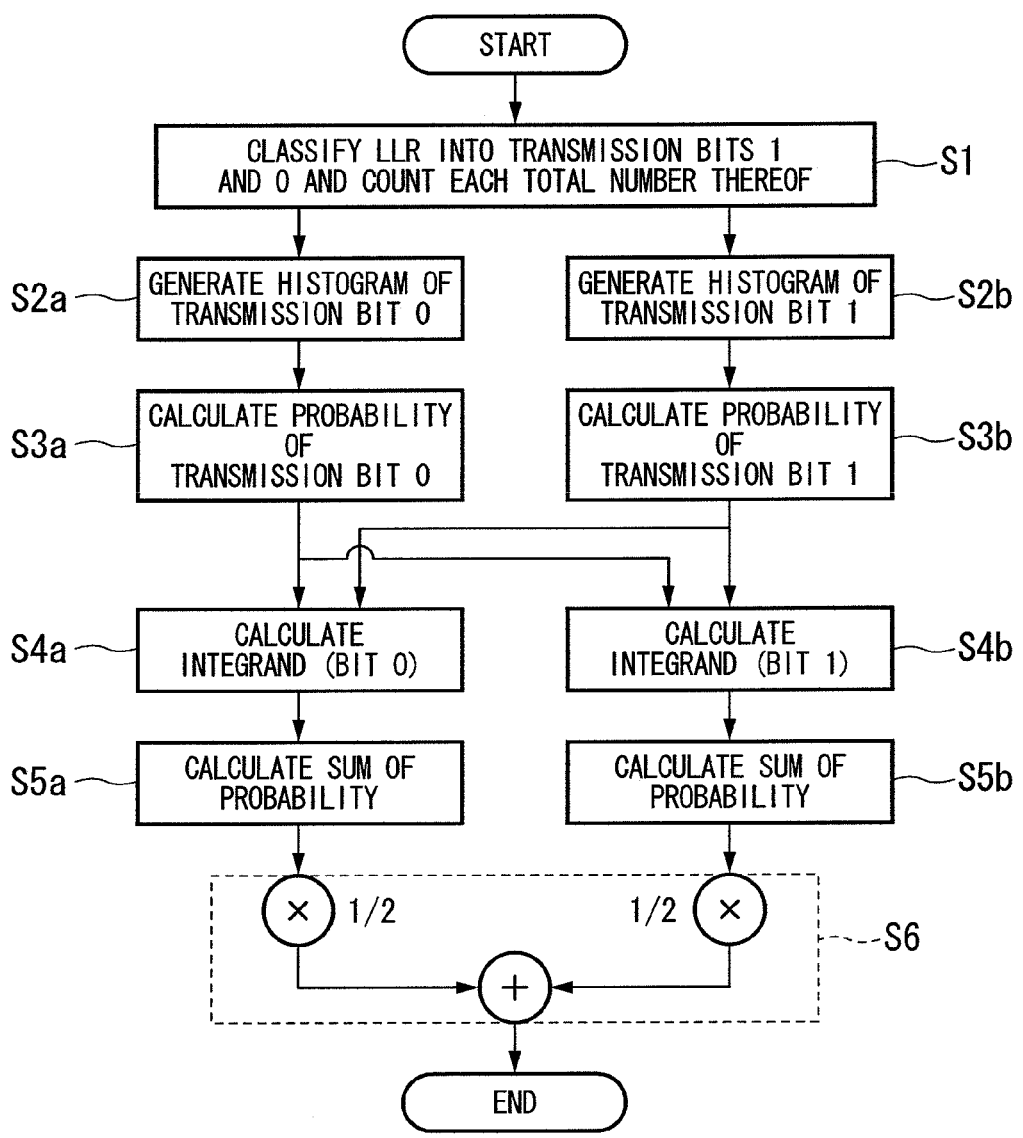
FIG. 6 is a flowchart showing a reception method of a reception device according to a fourth embodiment of the present invention.

FIG. 6 is a flowchart showing a reception method of the reception device according to the fourth embodiment of the present invention. In FIG. 6, a method of calculating a mutual information amount when a transmission bit sequence is known in the reception device is shown. When the transmission bit sequence is known in the reception device, the mutual information amount is expressed by Equation (13).

$$I_x = \frac{1}{2}\sum_{x=0,+1}\int_{-\infty}^{\infty} p(l|X=x)\log_2\left[\frac{2p(X=x)}{p(l|x=0)+p(l|x=+1)}\right]dl \quad (13)$$

In Equation (13), p(l|X=x) denotes a probability of the occurrence of a log likelihood ratio (LLR) of 1 when a transmitted signal is x. Equation (11) is an approximate equation of Equation (13) under an assumption that the ergodic property and the consistency condition are satisfied. Consequently, when the mutual information amount is calculated by Equation (13), it is possible to estimate a highly accurate mutual information amount in this embodiment as compared to the second embodiment.

In FIG. 6, first, in step S1, a log likelihood ratio (LLR) obtained by equalizing a pilot signal is classified into transmission in a bit 1 and transmission in a bit 0, and each total number thereof is counted.

Next, in step S2a, a histogram in the case where a transmission bit is 0 is calculated and generated. In step S2b, a histogram in the case where a transmission bit is 1 is calculated and generated.

Next, in step S3a, a probability of the transmission bit 0 is calculated by performing normalization by a total number of each of the transmission bits 0 and 1 counted in step S1. Also, in step S3b, a probability of the transmission bit 1 is calculated by performing normalization by a total number of each of the transmission bits 0 and 1 counted in step S1.

Next, in step S4a, an integrand of Equation (13) is calculated in the case of the transmission bit 0. At this time, x=0 is substituted. In step S4b, an integrand of Equation (13) is calculated in the case of the transmission bit 1. At this time, x=1 is substituted.

Next, in step S5a, the sum of the integrand for the transmission bit 0 calculated in step S4a is calculated. Also, in step S5b, the sum of the integrand for the transmission bit 1 calculated in step S4b is calculated.

Finally, in step S6, a mutual information amount is calculated by taking a sum of a value obtained by multiplying the sum of the integrand for the transmission bit 0 calculated in step S5a by ½ and a value obtained by multiplying the sum of the integrand for the transmission bit 1 calculated in step S5b by ½. In the fourth embodiment, a method of calculating a mutual information amount in the first or second embodiment may be used.

As described above, when the transmission bit is known in the reception device, the mutual information amount may be calculated as in this embodiment, and adaptive modulation and coding may be appropriately controlled. When a pilot signal is used, data of its own station following the pilot signal does not have to be multiplexed, and may be calculated in advance for when transmission is necessary.

According to the first to fourth embodiments, a modulation scheme or a coding rate in the adaptive modulation and coding schemes is set using a mutual information amount calculated from a log likelihood ratio (LLR) of a received bit after equalization. Consequently, it may be used to set a modulation scheme or a coding rate including the effect of inter-code interference or noise emphasis after equalization due to a change of a propagation channel. Thus, it is possible to select an appropriate modulation scheme or coding rate, and it is possible to improve an error rate or throughput when the transmission and reception devices perform communication. In addition, the reception device is able to estimate the quality of reception after equalization, regardless of a delay variance of the propagation channel.

In the above-described first to fourth embodiments, the case where the reception device sets a modulation scheme or a coding rate has been described, but a value of a mutual information amount may be fed back from the reception device to the transmission device, and the transmission device may set the modulation scheme or the coding rate.

Since the modulation scheme or the coding rate is set based on a log likelihood ratio (LLR) in the above-described first to fourth embodiments, it is applicable to, for example, a multicarrier scheme such as an OFDM scheme.

In the above-described embodiment, a control process of the transmission device or the reception device may be executed by recording a program for implementing a function of the transmission device (FIG. 1) or the reception device (FIGS. 2 and 5) to a computer readable recording medium and enabling a computer system to read and execute the program recorded to the recording medium. The "computer system" used herein includes an OS and hardware, such as peripheral devices.

The "computer readable recording medium" is a portable medium such as a flexible disc, magneto-optical disc, ROM and CD-ROM, and a storage device, such as a hard disk, built in the computer system. Furthermore, the "computer readable recording medium" may also include a medium that dynamically holds a program for a short period of time, such as a communication line when a program is transmitted via a network such as the Internet or a communication network such as a telephone network, and a medium that holds a program for a fixed period of time, such as a volatile memory in a computer system serving as a server or client in the above situation. The program may be one for implementing part of the above functions, or the above functions may be implemented in combination with a program already recorded to the computer system.

The embodiments of the present invention have been described in detail with reference to the drawings. However, specific configurations are not limited to the embodiments and may include any design in the scope without departing from the subject matter of the present invention.

INDUSTRIAL APPLICABILITY

The present invention is applicable to a radio communication system, a reception device, and a reception method which are able to improve an error rate or throughput when transmission and reception devices perform communication.

The invention claimed is:

1. A reception device which receives a signal transmitted by a transmission device, the reception device comprising:
   an equalization unit configured to equalize a received signal in frequency domain;
   a reliability calculation unit configured to calculate the reliability of a transmitted bit from the received signal after equalization;
   a mutual information amount calculation unit configured to calculate a mutual information amount based on the reliability of the transmitted bit calculated by the reliability calculation unit; and
   a notification signal generation unit configured to set at least one of a modulation scheme and a coding rate based on the mutual information amount calculated by the mutual information amount calculation unit to generate a signal to be reported to the transmission device, wherein
   the mutual information amount indicates how much information the reception device has obtained regarding the signal transmitted by the transmission device,
   the reception device receives the signal transmitted by the transmission device which changes at least one of a modulation scheme and a coding rate, and
   the reliability calculation unit calculates a log likelihood ratio based on an equivalent amplitude gain or a variance of equivalent noise.

2. A reception method using a reception device which receives a signal transmitted by a transmission device, the reception method comprising:
   equalizing a received signal in frequency domain;
   calculating a reliability of a transmitted bit from a received signal after equalization;
   calculating a mutual information amount based on the reliability of the transmitted bit obtained by the reliability calculation; and
   setting at least one of a modulation scheme and a coding rate based on the mutual information amount to generate a signal to be reported to the transmission device, wherein
   the mutual information amount indicates how much information the reception device has obtained regarding the signal transmitted by the transmission device,
   the reception device receives the signal transmitted by the transmission device which changes at least one of a modulation scheme and a coding rate, and
   in the calculation of the reliability, a log likelihood ratio is calculated based on an equivalent amplitude gain or a variance of equivalent noise.

3. A radio communication system comprising:
   a transmission device configured to perform transmission by changing at least one of a modulation scheme and a coding rate based on information reported from a reception device; and
   a reception device configured to equalize a distortion of a radio propagation channel by frequency domain equalization, wherein
   the reception device calculates the reliability of a transmitted bit from a received signal after equalization, calculates a mutual information amount based on the reliability of the transmitted bit, and sets at least one of a modulation scheme and a coding rate based on the mutual information amount to generate a signal to be reported to the transmission device,
   the mutual information amount indicates how much information the reception device has obtained regarding the signal transmitted by the transmission device,
   the reception device receives the signal transmitted by the transmission device which changes at least one of a modulation scheme and a coding rate, and
   the reception device calculates a log likelihood ratio based on an equivalent amplitude gain or a variance of equivalent noise.

4. The radio communication system according to claim 3, wherein the reception device performs the frequency domain equalization based on minimum mean square error.

5. The radio communication system according to claim 3, wherein the reception device calculates the reliability of each transmitted bit based on a mutual information amount calculated from a log likelihood ratio.

6. The radio communication system according to claim 5, wherein the reception device calculates the reliability of each transmitted bit based on a mutual information amount calculated from a transmitted signal to which a known bit has been allocated.

7. The reception device according to claim 1, wherein the equalization unit equalizes the received signal based on minimum mean square error.

8. The reception device according to claim 1, wherein the mutual information amount calculation unit calculates the mutual information amount based on the log likelihood ratio calculated by the reliability calculation unit.

9. The reception device according to claim 1, wherein the reception device receives the transmitted signal from the transmission device, the transmitted signal being multiplexed a pilot signal for propagation channel estimation and a transmission data signal, the transmission data signal being changed at least one of a modulation scheme and a coding rate in response to the quality of reception.

10. The reception method according to claim 2, wherein the reception method uses the reception device which receives the signal transmitted by the transmission device which changes at least one of a modulation scheme and a coding rate, wherein equalizing a received pilot signal in frequency domain.

11. The reception method according to claim 2, wherein the reception method uses the reception device which receives the transmitted signal from the transmission device, the transmitted signal being multiplexed a pilot signal for propagation channel estimation and a transmission data signal, the transmission data signal being changed at least one of a modulation scheme and a coding rate in response to the quality of reception.

12. The reception device according to claim 7,
wherein the mutual information amount calculation unit calculates the mutual information amount based on the log likelihood ratio calculated by the reliability calculation unit.

* * * * *